US012019749B2

(12) United States Patent
Yerra et al.

(10) Patent No.: US 12,019,749 B2
(45) Date of Patent: Jun. 25, 2024

(54) INTELLIGENT DETECTION OF CYBER SUPPLY CHAIN ANOMALIES

(71) Applicant: Bank of America Corporation, Charlotte, NC (US)

(72) Inventors: Pallavi Yerra, Hyderabad (IN); Ra Uf Ridzuan Bin Ma Arof, Singapore (SG); Surendran, Singapore (SG); Hemant Meenanath Patil, Maharashtra (IN)

(73) Assignee: Bank of America Corporation, Charlotte, NC (US)

( * ) Notice: Subject to any disclaimer, the term of this patent is extended or adjusted under 35 U.S.C. 154(b) by 384 days.

(21) Appl. No.: 17/668,430

(22) Filed: Feb. 10, 2022

(65) Prior Publication Data
US 2023/0252152 A1 Aug. 10, 2023

(51) Int. Cl.
*G06F 21/57* (2013.01)
*G06F 8/65* (2018.01)
*G06F 8/75* (2018.01)

(52) U.S. Cl.
CPC .............. *G06F 21/57* (2013.01); *G06F 8/65* (2013.01); *G06F 8/75* (2013.01)

(58) Field of Classification Search
CPC ........ G06F 21/554; G06F 21/566; G06F 8/53; G06F 8/65; G06F 8/71; G06F 21/552; G06N 20/10; G06N 20/20
See application file for complete search history.

(56) References Cited

U.S. PATENT DOCUMENTS

| 2018/0025157 A1* | 1/2018 | Titonis ................ H04W 12/128 726/22 |
| 2019/0132355 A1* | 5/2019 | Egbert ................ H04L 63/1483 |
| 2020/0311295 A1* | 10/2020 | Fox ...................... G06F 16/9014 |
| 2021/0182391 A1* | 6/2021 | Plate ...................... G06N 20/00 |
| 2021/0248268 A1* | 8/2021 | Ardhanari .............. G16H 10/60 |

* cited by examiner

*Primary Examiner* — Olugbenga O Idowu
(74) *Attorney, Agent, or Firm* — Weiss & Arons LLP (57) ABSTRACT

Systems, methods, and apparatus are provided for intelligent cybersecurity processing of a product update. A fetcher application may access an updated version of a software product, a prior version of the product, and a version control system for the product. A malicious software identification engine may process the data using batch or stream processing to identify suspect code and metadata anomalies in the updated version. The engine may decompile executable binary code to obtain source code for the updated version and the prior version. A machine learning engine may receive input from the malicious software identification engine and classify the input using an NER-based machine learning model. Based on output from the machine learning engine, a control dashboard may block installation of a malicious product update.

20 Claims, 5 Drawing Sheets

INTELLIGENT DETECTION OF CYBER SUPPLY CHAIN ANOMALIES

FIELD OF TECHNOLOGY

Aspects of the disclosure relate to machine learning based cybersecurity protocols.

BACKGROUND OF THE DISCLOSURE

Although an enterprise may be well-guarded against direct cyberattacks, a bad actor may attempt to inflict damage by targeting less secure elements in the cyber supply chain. For example, the bad actor may install malicious code within an update from a known and trusted software vendor.

Malicious code entering the system through the cyber supply chain may evade detection by conventional methods. For example, the malware routines may blend into a legitimate connection, may avoid executing in a contained testing environment, or may erase traces of themselves in the log files.

It would be desirable to develop apparatus and methods for detecting compromised software entering a secure system through a cyber supply chain. It would be desirable to use machine learning for intelligent cybersecurity while continually updating and improving the detection framework.

SUMMARY OF THE DISCLOSURE

Systems, methods, and apparatus for intelligent detection of cyber supply chain anomalies are provided.

A fetcher application may access an updated version of a software product, a prior version of the product, and a version control system for the product.

A malicious software identification engine may process the data using batch or stream processing. The engine may map a code change log to the updated version to identify code present in the updated version that does not conform to the change log.

The engine may decompile executable binary code to obtain source code for both versions and identify a code change between the versions. The engine may extract metadata from the updated version and the prior version to a identify a metadata change between the versions.

The engine may execute the updated version in a controlled environment to identify a behavioral change between the versions.

A machine learning engine may receive input from the malicious software identification engine. The machine learning engine may classify the input using machine learning models and output the results to a control dashboard.

A web crawler application may access previously identified malicious code from internet repositories and other web-based sources. The known malicious code may be applied to train the machine learning model. Outputs from the machine learning engine may also be applied to train the model.

The control dashboard may display a permission to install the product update. The control dashboard may block installation of the product update. The control dashboard may publish a warning regarding the product update.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Systems, methods, and apparatus for intelligent detection of cyber supply chain anomalies are provided.

Cybercriminals are continually searching for ways to infiltrate well-guarded organizations. One method involves identifying vulnerable points of attack at vendors within the supply chain as a means to gain access to the intended primary target. For example, an application may be in use across an organization and a relationship of trust may exist with the vendor. A bad actor may target an update to the deployed application by tampering with the manufacturing process to install a root kit. Once the update is deployed within the organization, malware may be released to affect other areas of the internal network.

A named entity recognition (NER) model may be combined with other machine learning algorithms to identify suspicious anomalies that could potentially introduce malicious code into the system. Information from a variety of sources may be gathered to train the NER model and to analyze candidate software updates.

For the sake of illustration, the invention will be described as being performed by a "system." The system may include one or more features of apparatus and methods that are described herein and/or any other suitable device or approach.

The system may include a web crawler application. The crawler may be designed to locate and download information about known malware signatures. The crawler may search web logs, public discussion forums, application markets, or any suitable source for security risks that have been previously identified. The crawler may access security bulletins from software manufacturers. The crawler may access open and normalized detection rules. The crawler may access commercial vulnerability scanners and aggregators.

The crawler may access internet repositories. For example, Common Vulnerabilities and Exposures (CVE) is a list of publicly disclosed computer security flaws that have been assigned CVE ID numbers. The National Vulnerability Database (NVD) is a U.S. government repository of standards-based vulnerability management data, including databases of security checklist references, security-related software flaws, misconfigurations, and product names.

Information obtained by the crawler may be stored in a software database. The data may include untrusted uniform resource locators (URLs), source code, binary code, application authors, or any suitable data. Untrusted software stored in the database may be verified with the software manufacturer. The database may also record the crawled source and the configuration used for the crawling process. Data from the software database may be used to train the NER model.

The system may include a data fetcher application. The data fetcher may identify information associated with a potential update from a variety of systems of record. The data fetcher may access a new version of software. The data fetcher may access an earlier version of the software that is installed on enterprise systems. The data fetcher may access a version control system from a source code repository. The data fetcher may access development platforms such as GitHub, Inc.

A source code database may store the information obtained by the fetcher. Data stored in the source code database may include application names, application authors, configuration files including permissions and roles for an application, current installed version, latest available version, digital signature, executable or package type, fetch source, or any suitable data. The source code database may include binary code, text, properties, and configuration files, application executables, URLs, or any suitable data formats.

Data from the source code database may be processed by a malicious software identification engine. The engine may identify public links, change logs, application permissions, trusts, certificates, behavior changes, and any other suitable data. In some embodiments, the system may use distributed stream processing to enable multiple forms of analysis operating in parallel. In some embodiments, the system may use batch processing.

The malicious software identification engine may analyze a change log associated with the updated version of the software. The change log may show changes between the updated version and the installed version. The system may map the change log to the updated version to identify changes. For example, the new version may have a change of font, an add-on search function, or a bug fix. The system may determine whether the code in the updated version conforms to the updates listed in the change log. For example, added malicious code may compromise compilation of the software and may sometimes be concealed by software with a legitimate certificate.

The malicious software identification engine may extract metadata from the updated version and the installed version of the software. Metadata may include the application name, author, digital signature or certificate, configuration file, executable or package type, version, application URL, or any other suitable data. The system may identify changes between metadata extracted from the updated version and from the installed version.

The malicious software identification engine may directly compare executable machine code for the installed version and the updated version to identify changes. The malicious software identification engine may directly compare source code for the installed version and the updated version to identify changes. For example, the system may identify an encrypted string, a new cryptographic function, a new library, or an added network within the updated version source code.

Applications may include compiled source code. Some applications may include open source code. Some applications may include closed source code. In some cases, binary executable code may be reverse engineered to generate decompiled source code. The reverse engineering may support a range of programming languages. Applications from closed sources that explicitly prohibit source code reverse engineering in their end user license agreements will not be decompiled.

The malicious software identification engine may review a dynamic analysis report. Dynamic analysis may include execution of the update in a contained environment (also known as a "sandbox") for various operating systems. Dynamic analysis may capture behavioral changes of the updated version over the previous version. The system may capture processing changes, memory changes and disk changes between the installed and updated versions of the software. The system may imitate user interaction on buttons or widgets and evaluate the effect.

The dynamic analysis report may assess code coverage. Code coverage tools may determine how code was exercised during execution. For example, function coverage may determine how many of the functions have been called and line coverage may determine how many lines of source code have been tested. Coverage of the instruction pointer may be tracked to identify areas of code evading execution. The system may identify sandbox evasion codes such as a sleep function tied to delayed execution. The system may assess the update for use of cryptographic or encoding modules that may screen malware.

Processed data from the malicious software identification engine and software database may be used as inputs for a machine learning engine. The engine may include a set of machine learning models. Machine learning models may include an NER based spaCy framework. SpaCy is an open-source software library for advanced natural language processing using Python programming language. The spaCy framework may include tokenization, text normalization, part of speech tagging, named entity recognition, word vectors, sentence detection, text normalization, or any other suitable components.

The NER model may be trained to identify untrusted software using data obtained by the crawler. The training may be ongoing. Crawler data may be updated continuously or at discrete intervals and may be input to the model on any suitable schedule. A Python-based feature extraction program may extract data from the software database. The NER model may be trained to develop labels and categories using cybersecurity keywords related to software development and input from public directories.

The NER model may receive inputs from the malicious software identification engine. The NER model may extract keywords from the text of the anomalies identified by the malicious software identification engine using Python-based feature extraction. The NER model may use natural language processing to annotate the text with one or more labels. The NER model may map keywords onto the corresponding binary code to understand the function of the code anomalies. The NER annotation may label the anomalies based on potential security risks.

Other machine learning algorithms may be applied to classify the data based on the annotations. Illustrative classification algorithms include random forest algorithms, logistic regression algorithms, support vector machine algorithms and decision tree algorithms.

The machine learning engine may improve over time. Records associated with extracted data may be annotated and sent back to the models as additional training data.

Based on the NER data, analytical machine learning models may flag malicious updates. If an update is flagged as malicious or potentially malicious, the system may block software installation or remove software requests. The system may publish malicious sites or URLs to provide a warning regarding the update.

The system may include one or more control center dashboards. The dashboards may be updated based on analytical outputs generated by the machine learning models. The dashboards may provide a view of software risk at an organizational level. The dashboard may provide permission to install the update. The dashboard may block installation of an update that has been flagged as malicious.

One or more non-transitory computer-readable media storing computer-executable instructions are provided. When executed by a processor on a computer system, the instructions perform a method for cybersecurity processing of a candidate software update.

The method may include fetching an updated version of the software, a version of the software installed on enterprise systems, and a version control system. The method may include processing the versions using stream or batch processing. The method may include mapping a code change log to the updated version to identify anomalies. The method may include decompiling executable binary code from the two versions to identify source code modifications. The method may include extracting metadata from the two versions and identifying anomalies. The method may include executing the updated version in a controlled environment and identifying behavioral changes or code that evades execution.

The method may include inputting any identified anomalies to a machine learning engine. The machine learning engine may perform feature extraction and use a NER model for natural language processing. The machine learning engine may use machine learning algorithms to classify annotated output from the NER model.

The method may include using a web crawler application to access internet repositories of publicly identified malicious code. The web crawler may search databases, discussion forums, web logs, manufacturer bulletins, or any suitable sources. Data retrieved by the web crawler may be used to train the machine learning models.

The method may include displaying permission to install the update on a control dashboard. The method may include flagging the software update as malicious on the control dashboard. The method may include blocking installation of the software update.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 1:
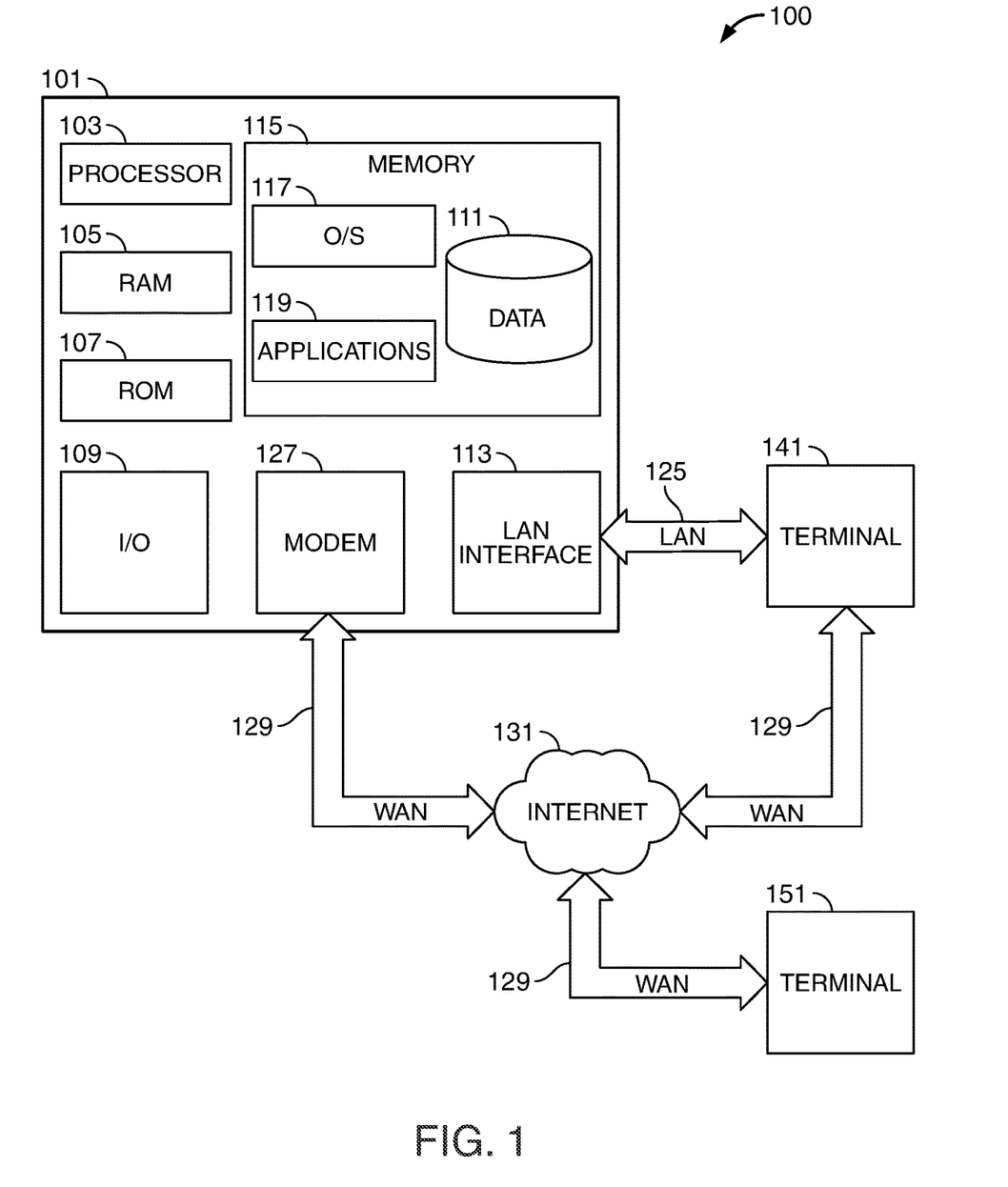
FIG. 1 shows illustrative apparatus in accordance with principles of the disclosure.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of fetching version data, web crawling, extracting and comparing code, extracting and comparing metadata, annotating and classifying inputs using machine learning, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
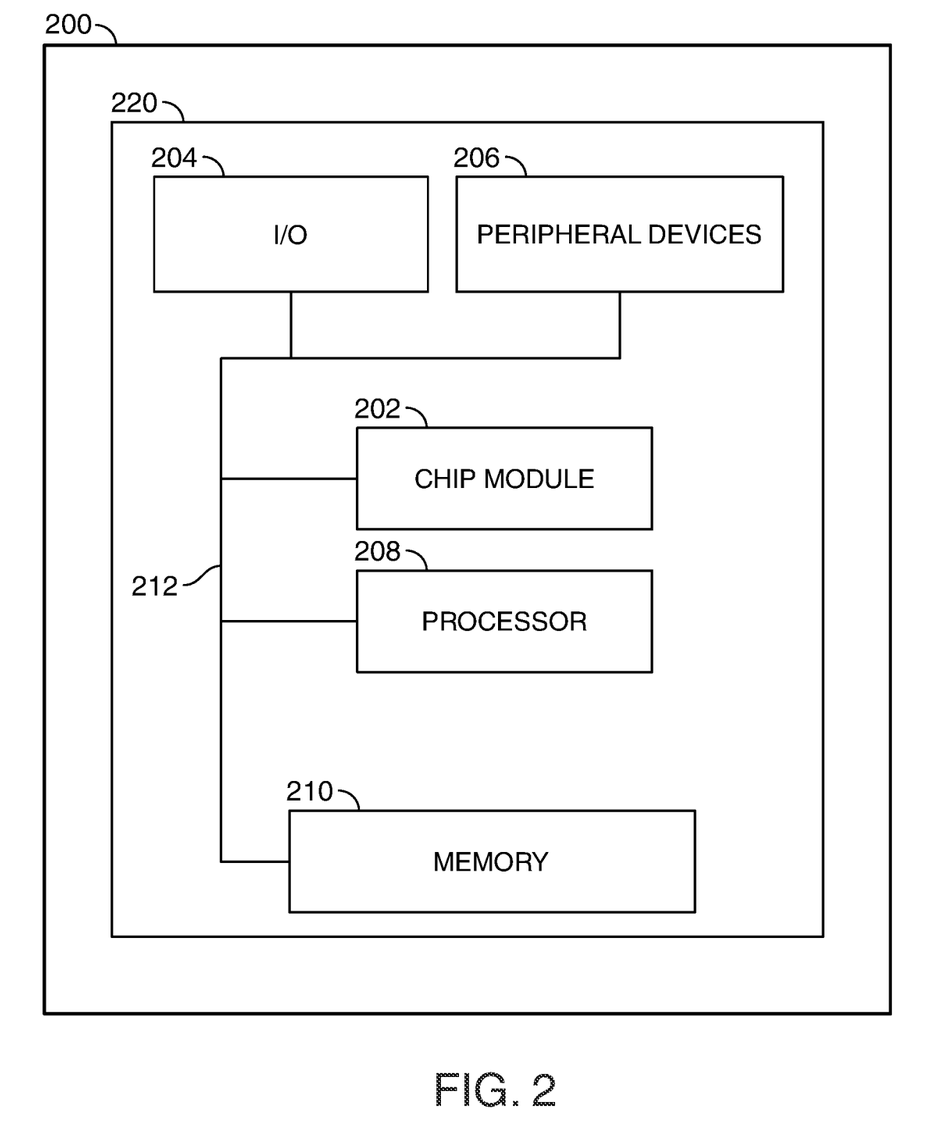
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may decompile binary code, identify source code changes, extract and compare version metadata, flag malicious code, train machine learning algorithms, update a control center dashboard, and perform other methods described herein; and machine-readable memory 210.

Machine-readable memory 210 may be configured to store in machine-readable data structures: binary code, source code, version control data, application metadata, code changes, dynamic analysis reports, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
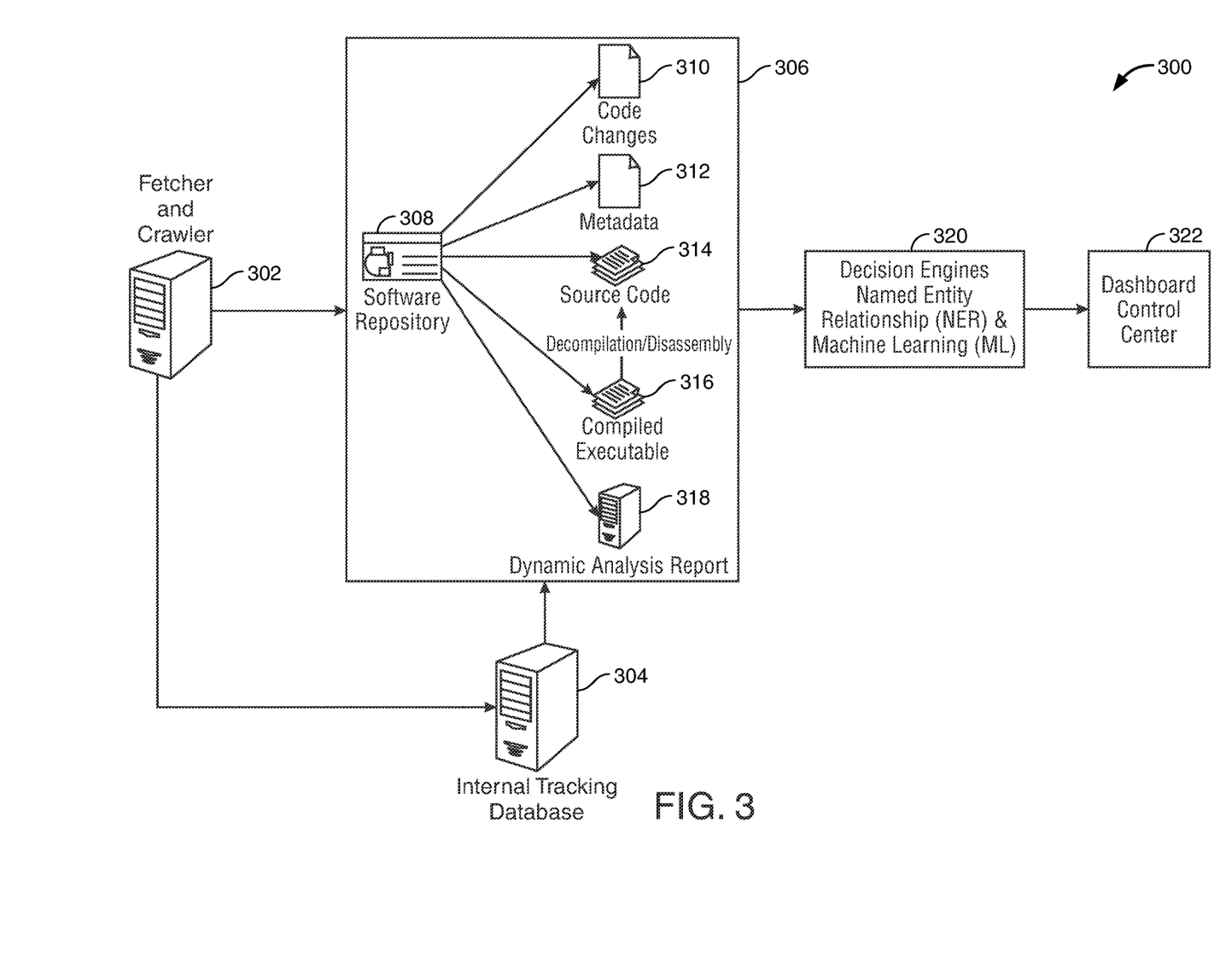
FIG. 3 shows an illustrative process flow in accordance with principles of the disclosure.

FIG. 3 shows high-level system overview 300. Fetcher and crawler applications may be stored in enterprise systems. The fetcher application may access code for existing software installations as well code for an updated version. The fetcher application may access a version control system for data associated with changes between the versions. The fetcher may coordinate with internal tracking database 304, which may store historical installation records for system software.

The data accessed by the fetcher may be stored in software repository 308. The data may be processed in order to identify anomalies for input to decision engines 320. The data may be processed using batch processing or stream processing.

A series of predetermined rules may be applied to identify potential anomalies. At step 310, a change log may be evaluated to identify new code in the updated version. The change log may be mapped to the code present in the updated version. At step 312, metadata from the updated version may be compared against metadata from the installed version. For example, a mismatch between authors or digital certificates from the two versions may be identified.

At step 316, compiled executable binary code may be decompiled to reconstruct the source code for a closed source update. At step 314, changes to the source code for the updated version may be identified. At step 318, a dynamic analysis report may identify other areas of suspicious code. Dynamic analysis may execute the update in a controlled environment to identify behavioral changes.

Anomalies, including code that is suspicious, added, or changed, may be input to decision engine 320. Decision engine 320 may include an NER model. The NER model may label the input code. Other machine learning algorithms may classify the code as malicious based on the NER annotations. Dashboard control center 322 may flag malicious updates, block installation of an update and/or publish a malicious update warning based on output from decision engine 320.

Figure 4:
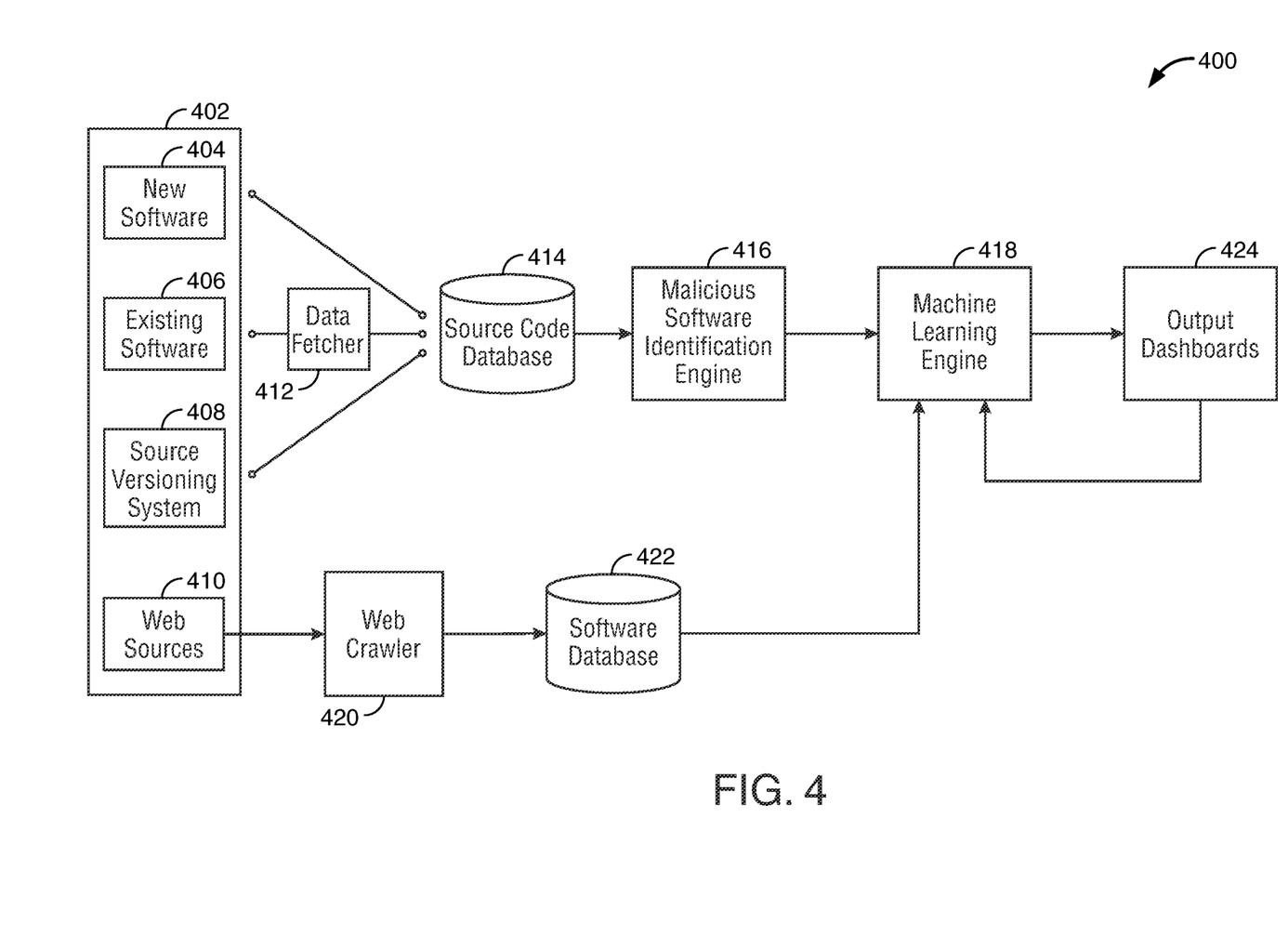
FIG. 4 shows an illustrative process flow in accordance with principles of the disclosure.

FIG. 4 shows illustrative process flow 400. Process flow 400 shows tracks involving fetcher and crawler applications. One or more elements of process flow 400 may overlap with elements of process flow 300, shown in FIG. 3.

Box 402 shows systems of record that may accessed by data fetcher 412 and web crawler 420. Data fetcher 412 may access an existing installation of software 406, new software 404, and source versioning system 408. Data obtained by the fetcher may be stored in source code database 414. Illustrative data stored in source code database 414 may include binary code, text, properties, configuration files, application executables, and URLs.

Data from source code database 414 may be processed by malicious software identification engine 416. Illustrative data processed by engine 416 may include public links, change logs, application permissions, certificates, and behavior changes. Suspicious code or metadata identified by engine 416 may be input to the machine learning engine 418.

Web crawler 420 may access web sources 410 for information regarding known malicious code. Data may be obtained from internet repositories, web logs, discussion forums, or any suitable sources, and may include government or industry data. Data obtained by the crawler may be stored in software database 422. Illustrative data stored in the software database may include untrusted URLs, untrusted software, and untrusted authors.

Data from software database 422 may be used to train machine learning engine 418 to identify malicious code. Machine learning engine 418 may output results to output dashboards 424. Results from output dashboard 424 may also be used to train the machine learning algorithms.

Figure 5:
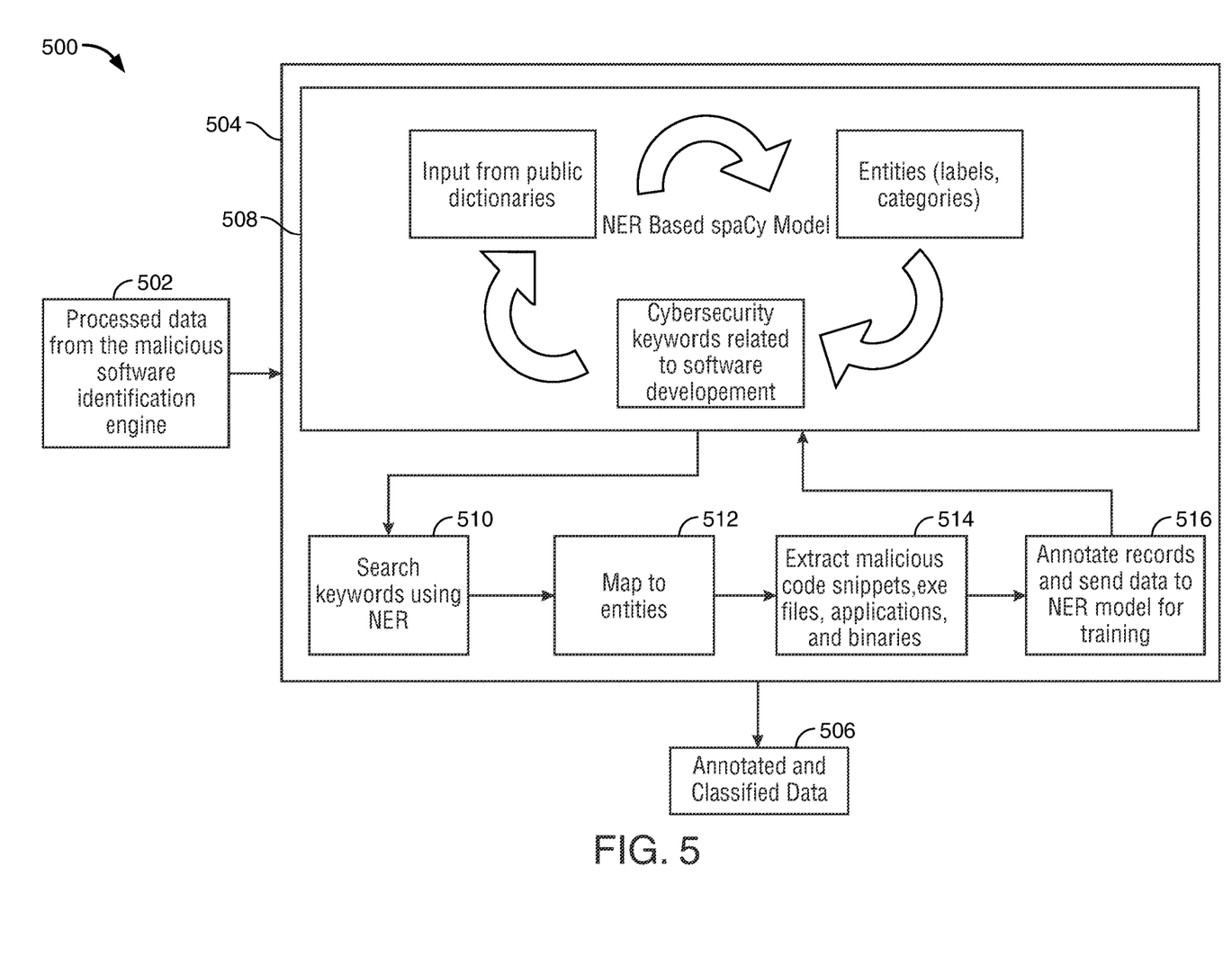
FIG. 5 shows an illustrative process flow in accordance with principles of the disclosure.

FIG. 5 shows illustrative process flow 500. Process 500 shows training of a machine learning engine. One or more elements of process flow 500 may overlap with elements of process flow 400, shown in FIG. 4 and process flow 300, shown in FIG. 3.

At step 502, processed data from the malicious software identification engine is input to machine learning engine 504. At step 506, outputs from machine learning engine 504 include annotated and classified data.

Machine learning model 504 may include NER model 508. NER model 508 may use a spaCy framework for natural language processing. The model may be continually updated with new categories and labels, cybersecurity keywords, and input from public repositories.

At step 510, machine learning engine 504 may use NER model 508 to search the input from the malicious data identification engine. At step 512, the NER model may map the data to entities. At step 514, based on the entity labels, the engine may extract malicious code. At step 516, records may be annotated based on the identified malicious code.

Thus, methods and apparatus for INTELLIGENT DETECTION OF CYBER SUPPLY CHAIN ANOMALIES are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for providing preprocessing of a product update prior to feeding product-related data to a machine learning engine, the method comprising:
   a fetcher application accessing an updated version of the product, a prior version of the product, and a version control system for the product;
   a malicious software identification engine, using a stream processing architecture:
      mapping a code change log to the updated version and determining whether code present in the updated version does not conform to the change log;
      decompiling executable binary code to obtain source code for the updated version and the prior version and determining whether a code change between the versions is present;
      extracting metadata from the updated version and the prior version and determining whether a metadata change between the versions is present; and
      executing the updated version in a controlled environment and determining whether a behavioral change between the versions is present;
   a machine learning engine:
      receiving an input from the malicious software identification engine; and
      annotating and classifying the input using a named entity recognition (NER) model; and
   a control dashboard, based on the annotation and classification from the machine learning engine:
      flagging the product update as malicious;
      blocking installation of the product update; and
      publishing a malicious update warning.

2. The method of claim 1 further comprising:
   a web crawler application identifying known malicious code in an internet-based repository and storing the known malicious code in a software database; and
   training the machine learning engine by transmitting the known malicious code to the NER model.

3. The method of claim 1, wherein the extracted metadata comprises application name, application author, digital certificate, package type, and application URL.

4. The method of claim 1, wherein the annotation comprises:
   mapping keywords extracted from the input;
   identifying coverage in the updated version associated with the keywords;
   extracting malicious code from the updated version; and
   annotating a record based on the extracted code.

5. The method of claim 1, wherein the behavioral change comprises a memory or disk change between the versions.

6. The method of claim 1, wherein the behavioral changes comprise an evasion code that fails to execute in the controlled environment.

7. The method of claim 6, further comprising the malicious software identification engine tracking coverage of an instruction pointer to identify code in the updated version evading execution.

8. One or more non-transitory computer-readable media storing computer-executable instructions which, when executed by a processor on a computer system, perform a method for cybersecurity processing of a product update, the method comprising:
   accessing an updated version of the product, a prior version of the product, and a version control system for the product;
   storing the accessed data in a source code database;
   at a malicious software identification engine, using distributed stream processing:
      mapping a code change log to the updated version to identify code in the updated version that does not conform to the change log;
      decompiling executable binary code for the updated version and the prior version to identify a change in source code between the versions;
      extracting metadata from the updated version and the prior version to identify a metadata change between the versions; and
      executing the updated version in a controlled environment to identify a behavioral change between the versions;
   at a machine learning engine:
      receiving a text-based input from the malicious software identification engine;
      annotating the input using a named entity recognition (NER) model;
      classifying the annotated input using a classification algorithm; and
   at a control dashboard, based on an output from the machine learning engine:
      blocking installation of the product update; and
      publishing a malicious update warning.

9. The media of claim 8, further comprising training the machine learning engine, the training comprising:
   a crawler application identifying known malicious code from an internet-based repository and storing the known malicious code in a software database; and
   training the NER model using the known malicious code.

10. The media of claim 8, wherein the accessed data comprises binary code, configuration files, application executables, and/or uniform resource locators (URLs).

11. The media of claim 8, further comprising the machine learning engine performing feature extraction on text-based input from the malicious software identification engine prior to annotation.

12. The media of claim 8, wherein the behavioral change comprises a memory or disk change between the versions.

13. The media of claim 8, wherein the behavioral change comprises a sleep delayed code that fails to execute in the controlled environment.

14. A system for providing cybersecurity processing for a product update prior to feeding product-related data to a machine learning engine, the system comprising:
- a fetcher application configured to access an updated version of the product, a prior version of the product, and a version control system for the product;
- a malicious software identification engine, configured to, using data from the fetcher application:
  - map a code change log to the updated version and determine whether code in the updated version does not conform to the change log;
  - decompile executable binary code to obtain source code for the updated version and the prior version and determine whether a code change between the versions exists;
  - extract metadata from the updated version and the prior version and determine whether a metadata change between the versions exists; and
  - execute the updated version in a controlled environment and determine whether a behavioral change between the updated version and the prior version exists;
- a machine learning engine configured to:
  - receive an input from the malicious software identification engine; and
  - annotate and classify the input using a named entity recognition model; and
- a control dashboard configured to, based on output from the machine learning engine, determine whether to permit installation of the product update.

15. The system of claim 14, wherein the control dashboard is configured to display permission to install the product update.

16. The system of claim 14, wherein the control dashboard is configured to:
- flag the product update as malicious;
- block installation of the product update; and
- publish a malicious update warning.

17. The system of claim 14, further comprising a web crawler application configured to access identified malicious code from an internet-based repository, wherein the identified malicious code is input to the machine learning model for training.

18. The system of claim 14, wherein the machine learning engine is further configured to perform feature extraction on text-based input from the malicious software identification engine prior to annotation.

19. The system of claim 14, wherein the behavioral change comprises a memory or disk change between the versions.

20. The system of claim 14, wherein the behavioral change comprises a sleep delayed code that fails to execute in the controlled environment.

* * * * *